United States Patent [19]

Knight

[11] 4,062,906
[45] Dec. 13, 1977

[54] TREATMENT OF RUBBER LATEX

[75] Inventor: Geoffrey Thomas Knight, Brickendonbury, England

[73] Assignee: The Board of the Rubber Research Institute of Malaysia, Malaysia

[21] Appl. No.: 632,719

[22] Filed: Nov. 17, 1975

[30] Foreign Application Priority Data

Nov. 18, 1974 United Kingdom .............. 49919/74

[51] Int. Cl.$^2$ .......................... C08K 5/32; C08K 5/36; C08L 7/00; C08L 7/02
[52] U.S. Cl. ............................... 260/739; 260/45.9 R; 260/781; 260/793; 260/799
[58] Field of Search ............ 260/739, 45.9 R, 779 M, 260/781, 793, 799

[56] References Cited

U.S. PATENT DOCUMENTS 2,126,268 8/1938 McGavack .......................... 260/820

FOREIGN PATENT DOCUMENTS 1,340,673 12/1973 United Kingdom.

OTHER PUBLICATIONS

Noble–Latex in Industry (Rubber Age) (N.Y.) (1953). (2nd ed.), pp. 46 & 382.
John–Chem. Abs. 74, 4432t (1971).
Gorton–J. Inst. Rubber Industry 8(3), 111–113, July 1974.

*Primary Examiner*—Donald E. Czaja
*Assistant Examiner*—H. H. Fletcher
*Attorney, Agent, or Firm*—Wenderoth, Lind & Ponack

[57] ABSTRACT

Natural rubber latex is treated with a para-nitrosoaniline in the presence of a metal dialkyldithiocarbamate in order to protect the rubber from oxidative degradation. A hydroxylamine salt is added to the rubber latex before, during or after the reaction to reduce coloration of the latex on storage.

12 Claims, No Drawings

TREATMENT OF RUBBER LATEX

British Pat. No. 1,255,645 discloses the treatment of latex with certain p-nitrosoanilines or p-nitrosophenols to form rubber-bound antioxidant groups which improve the ageing resistance of rubber vulcanizates, particularly after treatment with organic solvents e.g. as in dry-cleaning. The vulcanizates may be prepared directly from the latex (extruded thread, foam) or from dry rubbers prepared from the latex (moulded goods). The treatment disclosed was preferably carried out at temperatures below 50°, the reaction of the nitroso compound with rubber taking place in the latex or during storage of the wet coagulum at ambient temperature, although reaction during the drying of the coagulum at temperatures from 80° C to 130° C was also described. A major disadvantage of the process is the darkening of the latex, the rubber prepared from it, and rubber vulcanizates when the reaction takes place at temperatures above 50° C.

It is the object of the present invention to provide a process by which p-nitrosoanilines may be reacted with natural rubber latex to produce rubber-bound antioxidant groups without the serious discoloration suffered in the earlier process. The modified latex so produced is suitable for the preparation of light-coloured dry-cleaning resistant latex articles either immediately after the reaction or after storage for periods up to four weeks.

British Pat. No. 1,340,673 discloses that certain salts of thiols particularly metal salts of dialkyldithiocarbamic acid, may be used to improve the yield of rubber-bound antioxidants when p-nitrosoanilines or p-nitrosophenols are reacted with dry rubber. We have found that although the addition of zinc N, N-diethyldithiocarbamate (ZDEC) to latex containing p-nitrosodiphenylamine (NDPA) improves the yield of rubber-bound antioxidant and produces lighter coloured products, it is necessary to add a hydroxylamine salt such as hydroxylamine hydrochloride or hydroxylamine neutral sulfate in order to prevent the formation of the undesirable dark colouration on storage of the latex. Furthermore, contrary to the previous disclosures, it has been found advantageous to complete the reaction of the nitroso compound with the latex fairly rapidly by heating at temperatures above 50° C so that the majority of the reaction is completed quickly as this provides lighter coloured products.

Accordingly, one aspect of the present invention consists of treating a natural rubber latex with a p-nitrosoaniline, preferably at a temperature between 50° C and 70° C for between 2 and 24 hours, in the presence of a metal dialkyldithiocarbamate and a hydroxylamine salt, preferably either hydroxylamine hydrochloride or hydroxylamine neutral sulphate. The latex may be stored for periods of several weeks without discolouration.

According to a second aspect of the invention, the hydroxylamine salt, e.g. hydroxylamine hydrochloride or neutral hydroxylamine sulphate, may be added to the latex after the reaction with the nitroso compound. This has the advantage that slightly lower amounts of hydroxylamine compound are needed to prevent discolouration during storage.

The rubber latex may be either ammoniated field latex or latex concentrate. The reaction between the nitroso compound and the rubber takes place somewhat more quickly in field latex.

The preferred nitroso compound is p-nitrosodiphenylamine (NDPA) but an equivalent amount of the reaction product of NDPA with an isocyanate (British Pat. No. 1,340,672) or with an acyl halide (Belgian Pat. No. 779,810) may be used instead of the free nitroso compound. The level of p-nitrosoaniline used is preferably between 0.1 and 0.5 parts per hundred parts of rubber by weight (pphr) particularly 0.25 pphr.

The metal dialkyldithiocarbamate may be chosen from any of those commercially available, preferably a zinc dimethyl-diethyl- or dibutyldithiocarbamate, and is preferably used at a concentration of from 0.05 to 0.5 pphr. An amine complex of the zinc dialkyldithiocarbamate, e.g. the di-n-butylamine complex, may be used as envisaged in British Pat. No. 1,340,673. On economic grounds the preferred dithiocarbamate is zinc N,N-diethyldithiocarbamate, at a concentration of between 0.1 and 0.25 pphr, preferably 0.15 pphr.

The reaction between the nitroso compound and the rubber latex may be carried out at temperatures between 50° C and 70° C for periods of between 30 minutes at the higher temperature to 24 hours at the lower temperature. Reaction in ammoniated field latex appears to be faster than in latex concentrate, the time for complete reaction at 70° C being estimated as 30 minutes in field latex and two hours in latex concentrate. The preferred reaction conditions on the laboratory scales are 16 hours at 50°–55° C, but this can be varied to suit commercial conditions, e.g. during the maturation of compound latex before use in thread and foam production.

The hydroxylamine salt is preferably used in an amount of from 0.05 to 0.5 pphr and may be added to the latex as a 10% aqueous solution with efficient stirring. The preferred additive is hydroxylamine hydrochloride at a level of 0.1 to 0.3 pphr, preferably 0.2 pphr, added after reaction of the NDPA with latex.

The invention also provides a treated natural rubber latex having the following properties:

a. a half-filled barrel of the latex is stable to storage in air under ambient conditions for 5 days without substantial colouration;

b. the tensile strength of a vulcanized latex article made from the rubber latex remains at least 60% of its original value during treatment with carbon tetrachloride and aging for 3 days at 100° C in air.

It will be understood that this combination of properties has not hitherto been available in natural rubber latex. Commercially available rubber latex articles can have good light colour and good resistance to oxidative degradation, but they lose the degradation resistance on being treated with CCl$_4$ because the conventional antioxidant is leached out.

Articles made from rubber latex modified by treatment with a p-nitrosoaniline can have good resistance to oxidative degradation, even after treatment with CCl$_4$, but have hitherto inevitably been badly discoloured. This invention provides for the first time a natural rubber latex of good colour from which are made articles, e.g. latex foam or thread, having good resistance to oxidative degradation even after dry-cleaning.

The invention is illustrated but not limited by the following Examples:

EXAMPLE 1

Preparation of modified latex

A typical reaction is as follows: p-Nitrosodiphenylamine is added as a 33.3% ball-milled aqueous dispersion to 333g of high ammonia (HA) latex concentrate with stirring until the nitrosoamine has been well dispersed. Zinc N,N-diethyldithiocarbamate is then similarly added as a ball-milled 50% aqueous dispersion, and the mixture stirred for a further 10 minutes. The reaction vessel is covered with a polyethylene sheet to prevent evaporation and heated at 50°–55° C for 16 hours.

After being cooled to room temperature, the latex is slowly treated with a 10% aqueous solution of hydroxylamine hydrochloride with efficient stirring. If the addition is too rapid or the stirring inadequate some coagulation may occur.

EXAMPLE 2

Effect of hydroxylamine compounds on discoloration

Hydroxylamine hydrochloride (HH) or neutral hydroxylamine sulphate (HS) was added to latex either before or after the reaction with NDPA and the development of colour noted on storage. The results are shown in Tables 1 and 2.

Table 1

Storage discoloration of modified HA latex concentrate:
All additives present during reaction at 50° C for 16 hours

| Additives pphr | | | | Colour observed on storage after | | |
|---|---|---|---|---|---|---|
| NDPA | ZDEC | HH | HS | 2 days | 5 days | 21 days |
| 0.3 | 0.15 | — | — | purple | — | — |
| 0.3 | 0.15 | — | — | purple* | — | — |
| 0.3 | 0.15 | 0.1 | — | none | sl. purple | purple |
| 0.3 | 0.15 | 0.15 | — | none | none | sl. purple |
| 0.3 | 0.15 | 0.20 | — | none | none | none |
| 0.3 | — | 0.20 | — | purple | — | — |
| 0.2 | 0.15 | 0.2 | — | none | none | none |
| 0.4 | 0.15 | 0.2 | — | sl. purple | purple | — |
| 0.3 | 0.15 | — | 0.2 | none | none | sl. purple |

*Compound matured 16 hours at room temperature before reaction

Table 2

Storage discoloration of modified HA latex concentrate:
reaction at 55° C for 16 hours before addition of hydroxylamine compound

| Additive pphr | | | | Colour observed on storage after | | | |
|---|---|---|---|---|---|---|---|
| NDPA | ZDEC | HH | HS | 2 days | 5 days | 21 days | 30 days |
| 0.25 | 0.15 | — | — | purple | | | |
| 0.25 | 0.15 | 0.10 | — | none | none | sl. purple | purple |
| 0.25 | 0.15 | 0.15 | — | none | none | sl. purple | purple |
| 0.25 | 0.15 | 0.20 | — | none | none | none | sl. purple |
| 0.25 | 0.15 | 0.25 | — | none | none | none | sl. purple |
| 0.25 | 0.15 | — | 0.10 | none | none | sl. purple | purple |
| 0.25 | 0.15 | — | 0.20 | none | none | none | sl. purple |
| 0.25 | 0.15 | — | 0.25 | none | none | none | sl. purple |

EXAMPLE 3

Properties of rubbers obtained from modified HA latex concentrate

Latex modified according to the conditions of Table 2 was coagulated at pH5 by the addition of 10% formic acid, the coagulum washed hnd creped by three passes on a creping mill, crumbled by the addition of castor oil (3 passes) and dried at 60° C for 48 hours. The Plasticity Retention Index (PRI) accelerated storage hardening (DP) and Lovibound Colour Index (LCI) were measured on the rubbers before and after extraction with acetone for 24 hours. The LCI of dried films cast from the latex before coagulation was also measured. The results given in Table 3 show that the addition of hydroxylamine hydrochloride improves the colour of both the cast film and the rubber without decreasing the rubber-bound antioxidant activity, which is shown by the high level of PRI after acetone extraction. The viscosity stability usually associated with the addition of HS or HH is also found in these rubbers.

Table 3

Properties of modified rubbers from HA latex concentrate

| Additives (pphr) | | | Cast film | Unextracted | | | Extracted | |
|---|---|---|---|---|---|---|---|---|
| NDPA | ZDEC | HH | LCI | PRI | DP | LCI | PRI | LCI |
| — | — | 0.2 | 4.5 | 39 | 2 | 3 | 0 | — |
| — | 0.15 | 0.2 | 4.5 | 23 | 6.5 | 3 | 0 | — |
| 0.3 | 0.15 | — | 16 | 61 | 6 | 12 | 77 | 10 |
| 0.3 | 0.15 | 0.2 | 12 | 54 | 5 | 10 | 81 | 9 |

EXAMPLE 4

Properties of vulcanizates prepared from modified rubbers

Modified rubbers were prepared by the reaction of HA latex concentrate with NDPA (0.25 pphr) and ZDEC (0.15 pphr) at 50° C for 16 hours, hydroxylamine hydrochloride (0.1 pphr) added after cooling and the latex coagulated and dried as in Example 3. Test sheets were prepared from the gum and white formulations using either modified rubber or SMR 5 as the control.

The latex was not stored before use, but was in fact storage stable without discolouration for at least 21 days. The antioxidant used was N-isopropyl-N′-phenyl-p-phenylenediamine, and in all eight different vulcanizates were prepared. The initial and aged physical properties shown in Table 4.

Comparison of the results for vulcanizates B with C, and of F with G, shows that the modified rubber prepared with only 0.25 pphr of NDPA gives aging resistance in the unextracted vulcanizate equivalent to that obtained with 1 pphr of a conventional antioxidant. Comparison of vulcanizates C with D and G with H shows that the addition of further antioxidant to the modified rubber has little effect.

The superiority of the rubber-bound antioxidant is shown in the extracted vulcanizates by comparison of the tensile strength retention of vulcanizates C and D with A and B or G and H with E and F.

TABLE 4

| | Vulcanizate properties of modified NR rubbers | | | | | | | |
|---|---|---|---|---|---|---|---|---|
| Formulation | A | B | C | D | E | F | G | H |
| SMR 5 | 100 | 100 | — | — | 100 | 100 | — | — |
| Modified Rubber | — | — | 100 | 100 | — | — | 100 | 100 |
| Stearic Acid | 2 | 2 | 2 | 2 | 2 | 2 | 2 | 2 |
| Zinc Oxide | 5 | 5 | 5 | 5 | 5 | 5 | 5 | 5 |
| Sulphur | 2.5 | 2.5 | 2.5 | 2.5 | 2.5 | 2.5 | 2.5 | 2.5 |
| C.B.S.** | 0.5 | 0.5 | 0.5 | 0.5 | 0.5 | 0.5 | 0.5 | 0.5 |

TABLE 4-continued

| | Vulcanizate properties of modified NR rubbers | | | | | | | |
|---|---|---|---|---|---|---|---|---|
| Formulation | A | B | C | D | E | F | G | H |
| Nonox ZA* | — | 1.0 | — | 1.0 | — | 1.0 | — | 1.0 |
| Whiting | — | — | — | — | 50 | 50 | 50 | 50 |
| Titanium dioxide | — | — | — | — | 5 | 5 | 5 | 5 |
| Cure time for all samples 40'/140° C | | | | | | | | |
| Initial Physical Properties: | | | | | | | | |
| T.S. (MN/m$^2$) | 26.2 | 26.8 | 23.7 | 25.6 | 19.5 | 18.7 | 18.6 | 19.0 |
| M.300 (MN/m$^2$) | 1.7 | 1.7 | 2.0 | 2.0 | 2.1 | 2.1 | 2.6 | 2.2 |
| E.B. (%) | 825 | 830 | 710 | 705 | 730 | 730 | 630 | 710 |
| Aged 1 day at 100° C | | | | | | | | |
| T.S. retained (%) | 59 | 90 | 89 | 89 | 78 | 89 | 84 | 84 |
| M.300 retained (%) | 118 | 135 | 105 | 115 | 105 | 114 | 92 | 114 |
| E.B. retained (%) | 78 | 83 | 86 | 84 | 88 | 87 | 87 | 76 |
| Extracted 24 hrs. with acetone then aged 1 day 100° C | | | | | | | | |
| T.S. retained (%) | 31 | 30 | 94 | 90 | 39 | 42 | 93 | 99 |
| M.300 retained (%) | 100 | 118 | 130 | 150 | 86 | 100 | 92 | 118 |
| E.B. retained (%) | 70 | 69 | 84 | 78 | 82 | 82 | 78 | 75 |

*Trademark of Imperial Chemical Industries, Ltd. for N-isopropyl-N-phenyl-p-phenylenediamine.
**C.B.S. = (n-cyclohexyl-2-benzthiazyl sulphenamide)

Table 7

| | Ageing of moulded foams at 100° C | | | | | | | | | | | | | | | | | | | | |
|---|---|---|---|---|---|---|---|---|---|---|---|---|---|---|---|---|---|---|---|---|---|
| | Retention of compression modules (%) | | | | | | | | | | | | | | | | | | | | |
| Ageing | Wash 1 | | | | | Wash 2 | | | | | Clean 1 | | | | | Clean 2 | | | | | |
| days | J | K | L | M | N | J | K | L | M | N | J | K | L | M | N | J | K | L | M | N | |
| 1 | 59 | 80 | 86 | 95 | 88 | 53 | 71 | 77 | 88 | 87 | 58 | 86 | 93 | 116 | 116 | 44 | 56 | 67 | 108 | 108 | |
| 2 | 44 | 65 | 76 | 88 | 76 | 32 | 57 | 62 | 69 | 67 | 38 | 72 | 83 | 120 | 119 | 26 | 32 | 38 | 102 | 105 | |
| 3 | 39 | 63 | 74 | 86 | 73 | 33 | 50 | 59 | 61 | 57 | 30 | 68 | 81 | 121 | 120 | 74 | 34 | 32 | 98 | 99 | |
| 4 | 30 | 54 | 68 | 79 | 65 | 36 | 44 | 52 | 51 | 46 | 36 | 52 | 69 | 115 | 117 | 130 | 64 | 37 | 83 | 88 | |
| 5 | 34 | 50 | 64 | 72 | 58 | 50 | 38 | 48 | 45 | 41 | 62 | 50 | 64 | 108 | 105 | u | 134 | 49 | 78 | 80 | |
| 6 | 39 | 47 | 61 | 64 | 43 | 83 | 42 | 48 | 43 | 44 | 135 | 43 | 57 | 105 | 100 | u | u | 129 | 70 | 74 | |
| 7 | 49 | 43 | 55 | 57 | 41 | 128 | 46 | 45 | 42 | 52 | u | 41 | 52 | 97 | 90 | u | u | u | 65 | 66 | | u = untestable
The results show that the modified latex foams survive the washing and dry cleaning tests better than the protected unmodified foams, and that the addition of more antioxidant to the modified latex is unnecessary.

EXAMPLE 5

Table 5

Properties of moulded foam prepared from modified HA latex

Moulded foams were prepared from normal or modified HA latices using the following formulation:

| | Dry weight |
|---|---|
| Latex | 500 |
| Zinc oxide (50% dispersion) | 15 |
| Sulphur (50% dispersion) | 12.5 |
| ZDEC (50% dispersion) | 5.0 |
| ZMBT (50% dispersion) zinc mercaptobenzothiazale | 5.0 |
| Potassium oleate (20% solution) | 12.5 |
| Trimene Base (50% solution)* | (8 ml) |
| Sodium silicofluoride (20% dispersion) | (5 ml) |
| Antioxidant (50% dispersion) | varies |

*Trademark of Imperial Chemical Industries, Ltd. for condensates of formaldehyde, ammonia and ethyl chloride.

The performance of latex modified as in Example 4 was compared with normal HA latex concentrate with various levels of a conventional antioxidant, the samples being as shown in Table 6. The foams were aged at 100° C in air before and after Table 6

| | Latex foam samples | |
|---|---|---|
| Foam | Latex | Antioxidant (pphr) |
| J | HA | 0 |
| K | HA | 0.5 |
| L | HA | 1.0 |
| M | Modified HA | 0 |
| N | Modified HA | 0.5 | washing and dry-cleaning treatment, the property measured being the retention of compression modulus (Table 7). The washing cycle consisted of washing with a detergent for 15 minutes in a washing machine, followed by rinsing three times in warm water before spin drying and drying at 50° C. The dry cleaning cycle consisted of washing in carbon tetrachloride, squeezing dry and drying at 50° C. Ageing was carried out after one or two cycles.

EXAMPLE 6

Natural rubber latex, modified according to the invention, was compounded in field trials and run through a commercial latex thread plant. The product was compared with commercial latex thread.

| Composition of modified latex: | | |
|---|---|---|
| HA latex concentrate 60 d.r.c. | 100 | parts dry weight |
| NDPA | 0.3 | " |
| ZDC | 0.15 | " |
| Hydroxylamine sulphate | 0.10* | " |

*added as two equal amounts see procedure.

Modification procedure

The NDPA (33.3% dispersion) and ZDEC (50% dispersion) were added with stirring to the HA concentrate, and stirring was continued for 15 mins. The latex was then heated with 'live' steam whilst slow stirring was continued. The temperature was raised to 80° C and then the source of steam was removed and the latex allowed to cool to room temperature (~4 hrs, on 10 gal scale). Use of live steam results in dilution of latex hence after addition of 0.05 (dry weight) hydroxylamine sulphate (5% soln) the latex was recentrifuged. To the freshly concentrated latex was added an additional 0.05 parts of hydroxylamine sulphate and the latex was stored for one week in full drums before being compounded

| Compounding of latex for thread manufacture: | |
| --- | --- |
| | Dry weight (pphr) |
| Modified latex (60 drc) | 100 |
| Potassium hydroxide (10%) | 0.5 |
| Potassium oleate (20%) | 1.0 |
| Sulphur (50%) | 0.5 |
| ZMBT (50%) | 1.5 |
| ZDEC (50%) | 0.3 |
| Zinc oxide (50%) | 1.0 |
| Titanium dioxide (40%) | 7.5 |
| Antioxidant | 0.5 |
| Blue colour | slight. |

The compounded latex was run through a commercial latex thread plant. The resulting latex thread had a good light colour indistinguishable from commercial latex thread. The two threads were subjected to an accelerated aging test both before and after "dry cleaning" (washing in excess of CCl$_4$ and drying at 50° C), with the following results.

| | | Aging Results in Thread: | | | |
| --- | --- | --- | --- | --- | --- |
| % Retention of | | Commercial Control Thread | | Modified Thread | |
| Tensile strength, samples aged at 100° C in air. | Time of aging (days) | Original | After dry-cleaning | Original | After dry-cleaning |
| | 1 | 74 | 56 | 86 | 76 |
| | 2 | 60 | 8 | 81 | 76 |
| | 3 | 67 | 6 | 76 | 67 |

I claim:

1. In a method of treating preserved natural rubber latex which method comprises reacting rubber in the latex with a p-nitrosoaniline in the presence of a metal dialkyldithiocarbamate, the improvement which consists of including in the rubber latex, before, during or after the reaction, but before any significant coloration of the rubber latex has taken place, a hydroxylamine salt in an amount of from 0.05 to 0.5 parts by weight per 100 parts of rubber to reduce coloration of the latex on storage.

2. A method as claimed in claim 1, wherein the reaction is performed at a temperature of from 50° to 70° C for from ½ to 24 hours.

3. A method as claimed in claim 1, wherein the p-nitrosoaniline is used in a concentration of from 0.1 to 0.5 parts by weight per 100 parts of rubber.

4. A method as claimed in claim 1, wherein the metal dialkyldithiocarbamate is used in a concentration of from 0.05 to 0.5 parts by weight per 100 parts of rubber.

5. A method as claimed in claim 1, wherein the hydroxylamine salt is hydroxylamine hydrochloride or hydroxylamine neutral sulphate.

6. A method as claimed in claim 1, wherein from 0.1 to 0.3 parts, by weight per 100 parts of rubber, of hydroxylamine hydrochloride is added to the rubber latex after completion of reaction between the rubber and the p-nitrosoaniline.

7. The product of the process of claim 1.

8. A vulcanized article made from the latex of claim 7.

9. The product of claim 7 having the following properties:
   a. a half-filled barrel of the latex is stable to storage in air under ambient conditions for 5 days without substantial coloration;
   b. the tensile strength of a vulcanized latex article made from the rubber latex retains at least 60% of its original value during treatment with carbon tetrachloride and aging for 3 days at 100° C in air.

10. A vulcanized article made from the latex of claim 9.

11. A treated natural rubber latex having the following properties:
   a. a half-filled barrel of the latex is stable to storage in air under ambient conditions for 5 days without substantial colouration;
   b. the tensile strength of a vulcanized latex article made from the rubber latex remains at at least 60% of its original value during treatment with carbon tetrachloride and aging for 3 days at 100° C in air.

12. Vulcanized articles made from the latex claimed in claim 11.

* * * * *